United States Patent
Loh (10) Patent No.: US 11,302,299 B2
(45) Date of Patent: Apr. 12, 2022

(54) APPARATUS FOR CONTROLLING VEHICLE SOUND AND METHOD THEREOF

(71) Applicants: Hyundai Motor Company, Seoul (KR); Kia Motors Corporation, Seoul (KR)

(72) Inventor: Sang Won Loh, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/026,628

(22) Filed: Sep. 21, 2020

(65) Prior Publication Data

US 2021/0343268 A1 Nov. 4, 2021

(30) Foreign Application Priority Data

Apr. 29, 2020 (KR) .......... 10-2020-0052400

(51) Int. Cl.
*G10K 15/04* (2006.01)
*B60Q 5/00* (2006.01)
*H04R 1/02* (2006.01)
*H04R 3/00* (2006.01)

(52) U.S. Cl.
CPC .......... *G10K 15/04* (2013.01); *B60Q 5/008* (2013.01); *H04R 1/028* (2013.01); *H04R 3/00* (2013.01); *H04R 2499/13* (2013.01)

(58) Field of Classification Search
CPC ........ G10K 15/04; B60Q 5/008; H04R 1/028; H04R 3/00; H04R 2499/13
USPC .......................................................... 381/86
See application file for complete search history.

(56) References Cited

U.S. PATENT DOCUMENTS

| 2018/0090125 A1* | 3/2018 | Yeung ............... G10K 15/02 |
| 2021/0118421 A1* | 4/2021 | Bastyr ............... G10L 25/84 |

FOREIGN PATENT DOCUMENTS

KR        101535013        7/2015

\* cited by examiner

*Primary Examiner* — Paul Kim
*Assistant Examiner* — Douglas J Suthers
(74) *Attorney, Agent, or Firm* — Mintz Levin Cohn Ferris Glovsky and Popeo, P.C.; Peter F. Corless (57) ABSTRACT

An apparatus and method for controlling a vehicle sound may include a storage configured to store a user-optimized volume value set by a driver and a processor calculating a first sound according to a vehicle speed when a vehicle is driving, a second sound according to braking, and a third sound according to a vehicle status during turning of the vehicle based on the stored volume value and to mix and output at least one of the first to third sounds.

18 Claims, 7 Drawing Sheets

APPARATUS FOR CONTROLLING VEHICLE SOUND AND METHOD THEREOF

CROSS-REFERENCE TO RELATED APPLICATION

This application claims under 35 U.S.C. § 119(a) the benefit of Korean Patent Application No. 10-2020-0052400, filed in the Korean Intellectual Property Office on Apr. 29, 2020, the entire contents of which are incorporated herein by reference.

BACKGROUND

(a) Technical Field

The present disclosure relates to an apparatus and method for controlling a sound outputted by a vehicle, more particularly, to a sound providing method and a sound mixing method of an electric vehicle.

(b) Description of the Related Art

Recently, an increasingly important segment in the automotive industry is electric vehicles. As such, each automobile manufacturer is ready to launch various types of electric vehicles, and certain countries have implemented various policies such as tax reductions for purchasing an electric vehicle, reduced parking fees, preferred highway lanes and/or toll gates, and the like so as to encourage the purchase and use of electric vehicles.

Moreover, because reduction in environmental pollution is emphasized in recent social discourse, consumers are increasingly interested in electric vehicles and some buyers are also interested in electric vehicles due for other reasons including reduced vehicle maintenance costs. Furthermore, in view of the increasing number of charging stations in public places in addition to technological advances in battery charging, electric vehicles are recognized as more attractive vehicles, and improved driving range has helped overcome range anxiety previously experienced by consumers, thus making electric vehicles more attractive options.

In the meantime, in contrast to quietness and quietness, which are one of advantages of an electric vehicle, there are needs for requirements for outputting sufficient sound, e.g., to mimic the sound of an internal combustion engine vehicle. There is a need to improve the driving experience of electric vehicles during driving as a result of the sound output requirements.

Accordingly, there is a need for a sound system and method considering various issues associated with the sound produced by an electric vehicle at the time when an electric vehicle is driven.

SUMMARY

An aspect of the present disclosure provides an apparatus and method for outputting a vehicle sound.

Another aspect of the present disclosure provides an apparatus and method for outputting a vehicle sound in consideration of vehicle speed and engine speed (RPM).

Another aspect of the present disclosure provides an apparatus and method for outputting a vehicle sound in consideration of a vehicle braking level.

Another aspect of the present disclosure provides an apparatus and method for outputting a vehicle sound in consideration of a vehicle turning amount, i.e., a degree or amount by which a vehicle has turned.

Another aspect of the present disclosure provides an apparatus and method for outputting the vehicle sound in consideration of vehicle speed, braking, and/or vehicle conditions during turning of the vehicle.

Another aspect of the present disclosure provides an apparatus and method for outputting a vehicle sound by mixing various sounds based on various pieces of data detected while a vehicle is driving.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a vehicle sound controlling apparatus may include storage storing a user-optimized volume value set by a driver and a processor calculating a first sound according to a vehicle speed when a vehicle is driving, a second sound according to braking, and a third sound according to a vehicle status during turning of the vehicle based on the stored volume value and to mix and output at least one of the first to third sounds.

In the embodiment, the vehicle sound controlling apparatus may further include at least one speaker mixing and outputting the at least one of the first to third sounds.

In the embodiment, the processor may be configured to identify a signal transmitted from a vehicle speed sensor for sensing a speed of the vehicle, an accelerator position sensor (APS) for sensing an operation on state and an operation amount of an accelerator pedal, a brake pedal position sensor (BPS) for sensing an operation on state and an operation amount of a brake pedal to determine acceleration/deceleration of the vehicle and to output an acceleration sound or a deceleration sound depending on the determined acceleration/deceleration.

In the embodiment, the processor may be configured to set the acceleration sound or the deceleration sound for each section differently depending on a predetermined speed, and to output a different sound in each section.

In the embodiment, the processor may be configured to identify a brake hydraulic pressure, a motor torque, a regeneration step, and a BPS signal transmitted from a motor controlling device to determine a brake level of the vehicle; and to output a regeneration sound or a brake sound depending on the determined brake level of the vehicle.

In the embodiment, the processor may be configured to output the regeneration sound when the BPS signal is not present; and to output the brake sound when the BPS signal is present.

In the embodiment, the processor may be configured to output the regeneration sound at magnitude or frequency differently for each predetermined section.

In the embodiment, the processor may be configured to calculate a total sum of a determined brake wheel torque, and to output a different sound in each section predetermined depending on the sum and a brake sound of a different magnitude.

In the embodiment, the processor may be configured to identify a steering angle, a lateral acceleration, a yaw-rate, or a wheel-speed signal transmitted from an electronic stability control (ESC) to determine a turning amount of the vehicle, and to output a turning sound differently depending on the determined turning amount.

In the embodiment, the processor may be configured to output a sound through a speaker in a direction of an inner wheel or an outer wheel in the vehicle.

According to an aspect of the present disclosure, a method for controlling a vehicle sound may include storing a user-optimized volume value set by a driver, and calculating a first sound according to a vehicle speed when a vehicle is driving, a second sound according to braking, and a third sound according to a vehicle status during turning of the vehicle based on the stored volume value and mixing and outputting at least one of the first to third sounds.

In the embodiment, the method may further include mixing and outputting the at least one of the first to third sounds through at least one speaker.

In the embodiment, the method may further include detecting a speed of the vehicle, detecting an operation on state and an operation amount of an accelerator pedal, detecting an operation on state and an operation amount of a brake pedal, determining acceleration/deceleration of the vehicle through one or more of the detecting steps, and outputting an acceleration sound or a deceleration sound depending on the determined acceleration/deceleration.

In the embodiment, the method may further include setting the acceleration sound or the deceleration sound for each section differently depending on a predetermined speed and outputting a different sound in each section.

In the embodiment, the method may further include identifying a brake hydraulic pressure, a motor torque, a regeneration step, and a BPS signal transmitted from a motor controlling device to determine a brake level of the vehicle and outputting a regeneration sound or a brake sound depending on the determined brake level of the vehicle.

In the embodiment, the method may further include outputting the regeneration sound when the BPS signal is not present and outputting the brake sound when the BPS signal is present.

In the embodiment, the method may further include outputting the regeneration sound at magnitude or frequency differently for each predetermined section.

In the embodiment, the method may further include calculating a total sum of a determined brake wheel torque and outputting a different sound in each section predetermined depending on the sum and a brake sound of a different magnitude.

In the embodiment, the method may further include identifying a steering angle, a lateral acceleration, a yaw-rate, or a wheel-speed signal transmitted from an ESC to determine a turning amount of the vehicle and outputting a turning sound differently depending on the determined turning amount.

In the embodiment, the method may further include outputting a sound through a speaker in a direction of an inner wheel or an outer wheel in the vehicle.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referral to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Below, various embodiments of the present disclosure will be described in detail with reference to FIGS. 1 to 6.

Figure 1:
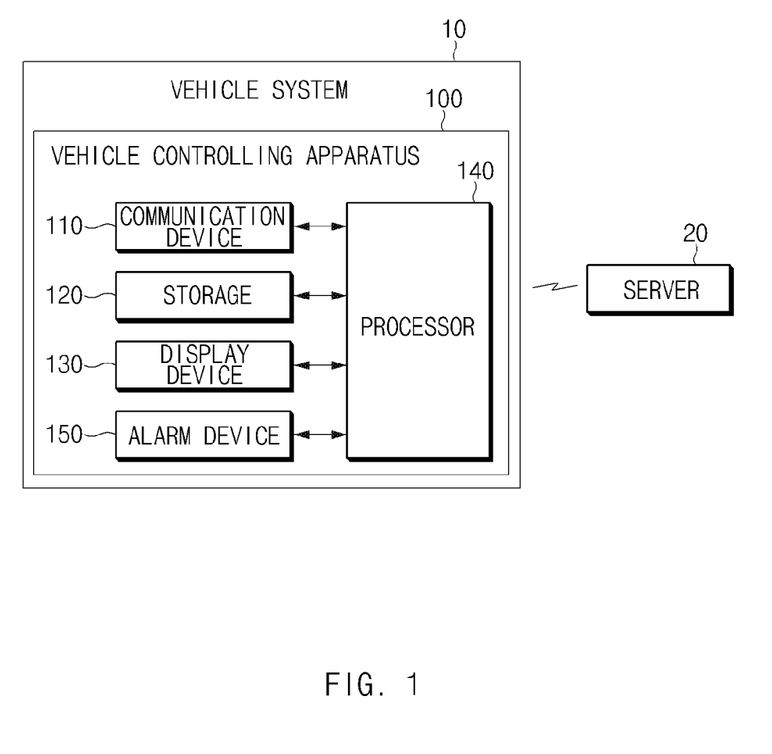
FIG. 1 is a block diagram illustrating a configuration of a vehicle system including a vehicle controlling apparatus, according to an embodiment of the present disclosure.

FIG. 1 is a block diagram illustrating a configuration of a vehicle system 10 including a vehicle controlling apparatus, according to an embodiment of the present disclosure.

Referring to FIG. 1, according to an embodiment of the present disclosure, a vehicle controlling apparatus 100 may include a communication device 110, storage 120, a display device 130, a processor 140, and an alarm device 150.

The communication device 110 may be a hardware device implemented with various electronic circuits for transmitting and receiving signals over a wireless or wired connection; in the present disclosure, the communication device 110 may perform communication in the vehicle through Controller Area Network (CAN) communication, CAN-FD communication, LIN communication, Ethernet communication, and the like; the communication device 110 may include various communication units such as a mobile communication unit for communication with a server 20 and an external diagnosis device, which are placed outside a vehicle, a broadcast receiving unit such as a DMB module or a DVB-H module, a short range communication unit such as a ZigBee module being a Bluetooth module or an NEC module, a Wi-Fi communication, and the like. Herein, the CAN communication is a vehicle network system developed to provide digital serial communication between various measurement and control devices in a vehicle; the CAN-data bus is used to transmit and control data between ECUs.

The communication device 110 receives signals from a plurality of sensors in the vehicle and then provides the signals to a virtual engine sound system. Furthermore, the communication unit 110 may perform bidirectionally communication with surrounding vehicles, or may perform bidirectionally communication between a vehicle and a road infrastructure and between a vehicle and a pedestrian; the communication unit 110 may continuously share and send/receive data with all elements including the host vehicle and surrounding vehicles. The communication device 110 may be implemented to be mounted on the vehicle itself or to be in contact with a V2X communication terminal; in this way, it is possible to perform communication between vehicles and infrastructure communication between vehicles, and it is possible to autonomously drive to the specified destination through a vehicle sensor and a driving control function provided in the vehicle. The communication device 110 may support WAVE communication technology for V2X communication function, or may support communication technology of 3GPP-based LTE/NR system.

Herein, according to an embodiment of the present disclosure, the vehicle sensor provided in the vehicle may include at least one of a global positioning system (GPS) sensor, a gyro sensor, an acceleration sensor, a G sensor, or a yaw-rate sensor. Moreover, the vehicle sensor may include a driving/braking/turning device and module (unit) for calculating a vehicle state. The vehicle sensor may include a state calculation device for identifying a vehicle speed, a speed of each wheel (FL, FR, RL, or RR), a brake hydraulic volume, a motor torque, lateral g, longitudinal g, yaw-rate, steering angle, or the like.

The storage 120 may store data, which is received from the server 20 and downloaded for the vehicle wireless update, via the communication device 110. Accordingly, the storage 120 may store/manage/update pieces of information about a road environment and road surrounding information such as location information of the host vehicle, road information, and bus station information, which are collected through vehicle sensors provided in the vehicle and the server 20. Furthermore, the storage 120 may store/manage data of various input sensors for supporting autonomous driving, and data through a server supporting road information and communication information. In addition, the storage 120 may store at least one or more of a network load, a vehicle power state, a battery state, and/or the predicted time required to transmit remaining ROM data, which are determined by the processor 140.

According to an embodiment of the present disclosure, the storage 120 may store/update the sound value set by a user based on the engine, transmission, driving method, and the like of a vehicle. In particular, it is possible to manage the sound for relieving fatigue during driving and making driving enjoyable, based on the 'sound system' according to the user's settings. In particular, it is possible to mix and store an engine pitch sound, a background sound, an auditory user interface (AUI), a sound and a sound for external pedestrians, and the like, by reflecting the speed/RPM of the electric vehicle in real time. Furthermore, the storage 120 stores a vehicle speed, a speed of each wheel (FL, FR, RL, or RR), a brake hydraulic volume, a motor torque, lateral g, longitudinal g, yaw-rate, steering angle, or the like and may store a preset value for each component for sound output.

The storage 120 may include at least one type of a storage medium among a flash memory type of a memory, a hard disk type of a memory, a micro type of a memory, and a card type (e.g., a Secure Digital (SD) card or an eXtream Digital (XD) card) of a memory, a Random Access Memory (RAM) type of a memory, a Static RAM (SRAM) type of a memory, a Read-Only Memory (ROM) type of a memory, a Programmable ROM (PROM) type of a memory, an Electrically Erasable PROM (EEPROM) type of a memory, an Magnetic RAM (MRAM) type of a memory, a magnetic disk type of a memory, and/or an optical disc type of a memory.

The display device 130 may be controlled by the processor 140 to display a screen for receiving the approval of user authentication for the wireless update of a vehicle. The display device 130 may be implemented with a head-up display (HUD), a cluster, or an audio video navigation (AVN). Furthermore, the display device 130 may include at least one of a Liquid Crystal Display (LCD), a Thin Film Transistor-LCD (TFTLCD), a Light Emitting Diode (LED) display, an Organic LED (OLED) display, an Active Matrix OLED (AMOLED) display, a flexible display, a bended display, and/or a 3D display. Some of the displays may be implemented with a transparent display that is transparent or translucent to view the outside. Moreover, the display device 130 may be provided as a touchscreen including a touch panel and may be used as an input device in addition to an output device.

The processor 140 may be electrically connected to the communication device 110, the storage 120, the display device 130, the alarm device 150, and the like, may electrically control each of the components, may be an electrical circuit that executes the instructions of the software, and may perform various data processing and calculation described below.

According to an example of the present disclosure, the processor 140 may update/manage the sound setting value set by the user in consideration of the speed, braking, and turning of the vehicle. That is, the processor 140 calculates the sound for each vehicle speed, calculates the sound for each brake, or calculates the sound during turning, in consideration of a vehicle speed (kph), a wheel speed (FL, FR, RL, or RR), a brake (hydraulic volume), a motor torque, lateral g, longitudinal G, Yaw-rate, steering angle, or the like, which is provided in the vehicle; accordingly, the processor 140 generates the mixed sound in consideration of various factors during the driving and then calculates the sound. In this way, it is possible to make driving more pleasant and enjoyable by enabling a driver to recognize the differentiated sound during driving.

When a screen for receiving approval from a user is displayed on the display device 130, the alarm device 150 may output a notification for approval to the user. Alternatively, the alarm device 150 may provide various pieces of information about driving guidance, traffic safety, or the like such as resetting the route for the degree of congestion, the alarm of the degree of congestion, or the like. According to an embodiment of the present disclosure, the alarm device 150 may provide an alarm warning sound, or the like based on information detected through sensors in the vehicle in consideration of the distance between vehicles, the collision with a pedestrian, and braking matters. Furthermore, the alarm device 150 may detect the driver's face direction, a blink rate, yaw-rate, and a lane departure or the like, and may provide an alarm for preventing the driver's drowsy driving or fatigue driving.

Generally, as a vehicle of an internal combustion engine has a noise even in high-speed driving or general driving, the driver is driving while listening to the noise of a vehicle. On the other hand, the electric vehicle becomes quiet as the electric vehicle is driving at a higher speed. The electric vehicle has an advantage that there is no noise. However, the sound is required for pedestrians to recognize a vehicle for safety in actual vehicle driving, and the sound is also required for the driver to drive pleasantly.

To this end, a virtual engine sound system (VESS) providing a sound similar to an actual vehicle with an internal combustion engine may be provided. For example, typically there is little or no noise in electric vehicles powered by electric motors (EV), plug-in hybrid vehicles (PHEV), and hybrid vehicles (HEV) during driving. However, there may be a collision risk between a vehicle and a pedestrian due to the lack of noise. Accordingly, to avoid the risk of such the collisions/crashes, it is possible to artificially generate engine noise to prevent the risk of pedestrian collision by installing a speaker in an electric vehicle. At this time, the VESS may be operated when a vehicle is driving at a low speed that is not greater than a predetermined speed. In the meantime, various rules have been proposed or enacted that mandate such vehicles to emit warning or engine sounds with respect to a specific speed, in the UN Economic Commission for Europe (ECE) and the US Road Traffic Safety Administration.

Figure 2:
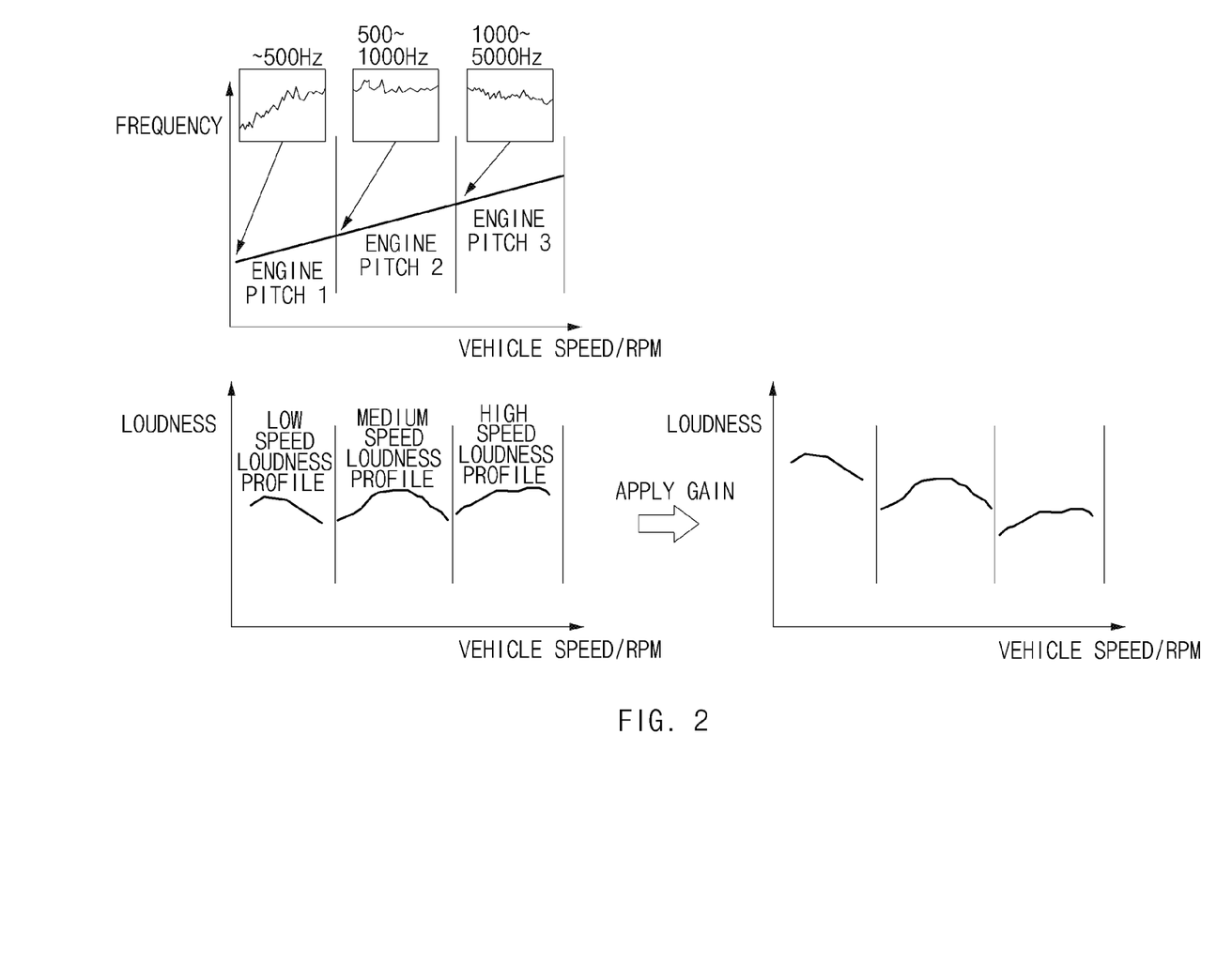
FIG. 2 is a diagram illustrating a concept of outputting sound based on the speed/RPM of a vehicle in a vehicle system according to an embodiment of the present disclosure.

FIG. 2 is a diagram illustrating a concept of outputting sound based on the speed/RPM of a vehicle in a vehicle system according to an embodiment of the present disclosure.

Referring to FIG. 2, a vehicle system may divide the region of a vehicle speed into regions of a low speed (~500 Hz), a medium speed (500~1000 Hz), and a high speed (1000~5000 Hz) based on the vehicle speed and engine speed (RPM), provides a sound for shift feeling depending on a specific point of time, such as a transmission shift of a kind of internal combustion engine, and provides a sound in the form that enhances the driving feeling for the driver (an engine pitch 1, an engine pitch 2, and an engine pitch 3).

For example, when the driver engages in off-street performance driving, such as on a track, because an electric vehicle does not have a sound of a shift stage change and a background engine noise (a frequency change depending on RPM), it is difficult to determine the vehicle speed based on these sounds. Accordingly, to solve this determination problem, in the present disclosure, it is possible to provide driving sound according to acceleration/deceleration, and sound assistance according to additional braking and turning limit prediction; in this way, the driver may make it possible to determine the vehicle speed through the sound assistant and to enjoy fun driving without looking at the dashboard separately.

In particular, the present disclosure proposes a sound assist processing method when an electric vehicle is driving; the present disclosure mixes an engine pitch sound, a background sound or AUI, a sound and an external pedestrian sound, by reflecting the speed/RPM of the electric vehicle in real time; the present disclosure provides a virtual sound system of a vehicle that may achieve a harmony between vehicle speed and actual sound.

Figure 3:
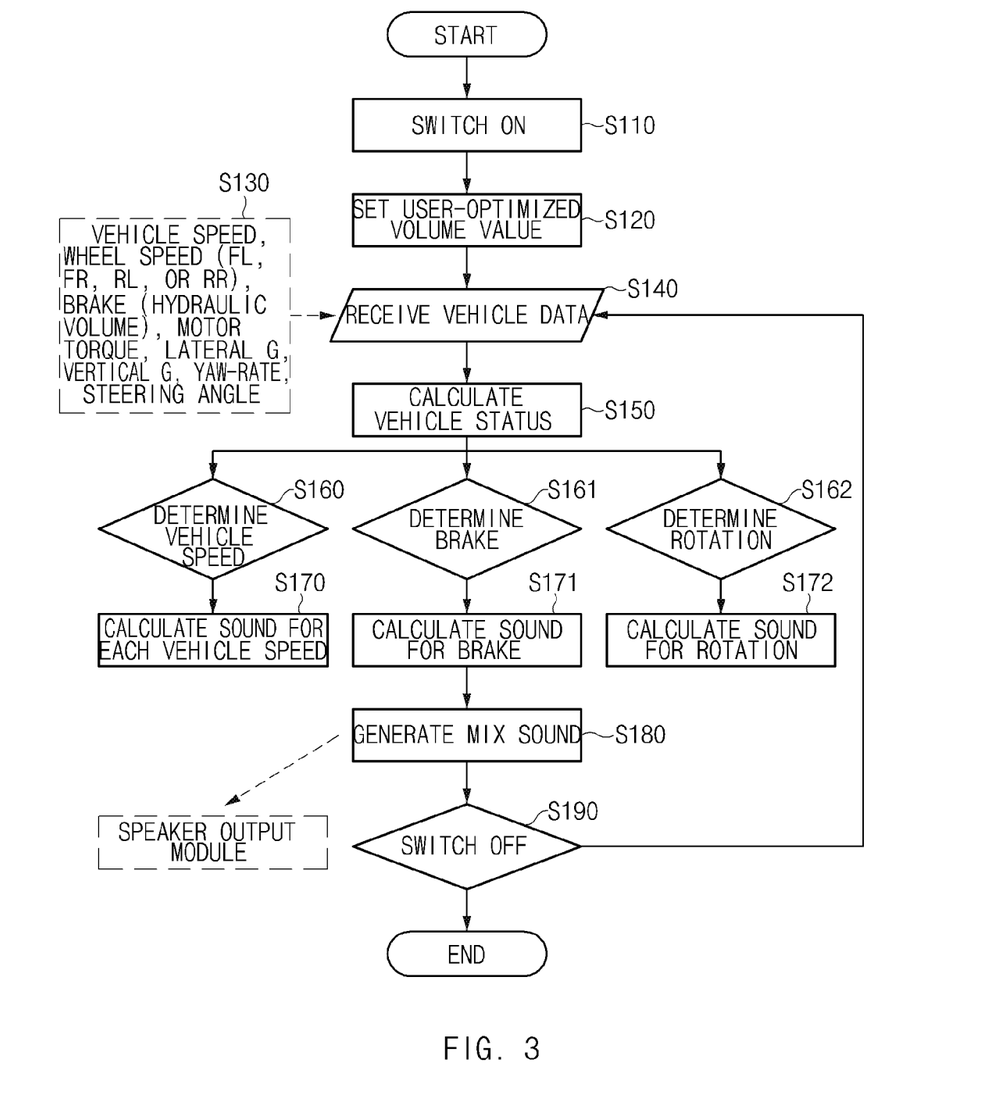
FIG. 3 is a flowchart conceptually illustrating a procedure for performing sound mixing in consideration of sound distinction elements of a vehicle according to an example of the present disclosure.

FIG. 3 is a flowchart conceptually illustrating a procedure for performing sound mixing in consideration of sound distinction elements of a vehicle according to an example of the present disclosure.

Referring to FIG. 3, when a driver turns on (step 110) a switch to use a sound system, an operation is started, and the driver sets (step 120) a user-optimized volume value. The volume value set by a user is reflected in the sound system. It is becoming important to present not only visual information but also multi-sensory information about a voice, a sound, a tactile sense, or the like due to the rapid development of the multimedia environment. In this regard, the efficient service provision through AUL voice user interface (VUI), tactile user interface (TUI), or the like is increasingly required. Furthermore, an emotional dimension index for each user for the physical properties of sound, for example, pitch, loudness, timbre, duration, or the like may be defined differently.

Accordingly, the user-optimized volume value according to an embodiment of the present disclosure may be defined as a value for providing a user-optimized sound, in consideration of the driver's sound system option according to settings of the driver/user or when a vehicle is purchased.

The vehicle state calculation apparatus in the vehicle sound system identifies the vehicle speed, the wheel speed of each wheel (FL, FR, RL, or RR), a brake hydraulic volume, a motor torque, lateral g, longitudinal G, Yaw-rate, steering angle, or the like (step 130), collects the various detected data (step 140), and identifies the vehicle status based on the data (step 150), based on the set volume value. That is, the processor in the vehicle performs calculation to output the mixed sound updated in consideration of the speed, braking, and turning of the vehicle based on the sound setting value set by a user.

Accordingly, the vehicle sound system calculates the sound for each vehicle speed based on the vehicle speed (step 160) among the identified data (step 170). Moreover, the vehicle sound system determines the braking performance with reference to the brake hydraulic volume and the motor torque (step 161), and calculates the brake sound corresponding thereto (step 171). The vehicle sound system calculates the turning sound (step 172) based on the calculated value such as the lateral g and the wheel slip amount for each wheel (step 162). The calculation methods for the steps 170, 171, and 172 according to the respective elements will be described in detail in FIGS. 4 to 6. The vehicle sound system generates a mixing sound based on the calculated sound (step 180). At this time, when a stereo configuration is possible, in the case of a turning sound, the sound is heard from the inner or outer wheel side. For example, it is possible to output the corresponding sound through the speaker mounted on the bumper in the vehicle.

In the meantime, when the driver turns off a switch, the sound system is interrupted (step 190).

As described above, the present disclosure expresses the state of the vehicle as sound depending on the driver's input (the manipulation of an accelerator pedal, a brake pedal, or a steering wheel) when the electric vehicle is driving and provides a virtual shift feeling of a vehicle using a virtual sound. That is, the present disclosure provides the vehicle information to the driver by acoustically expressing the sound distinction element according to the vehicle speed, the sound distinction element according to the brake/regenerative braking, and the division element according to the vehicle status during turning of the vehicle. In this way, stability is increased by allowing the driver to focus on driving without visual loss, and a fun drive is possible through auditory assistance.

Figure 4:
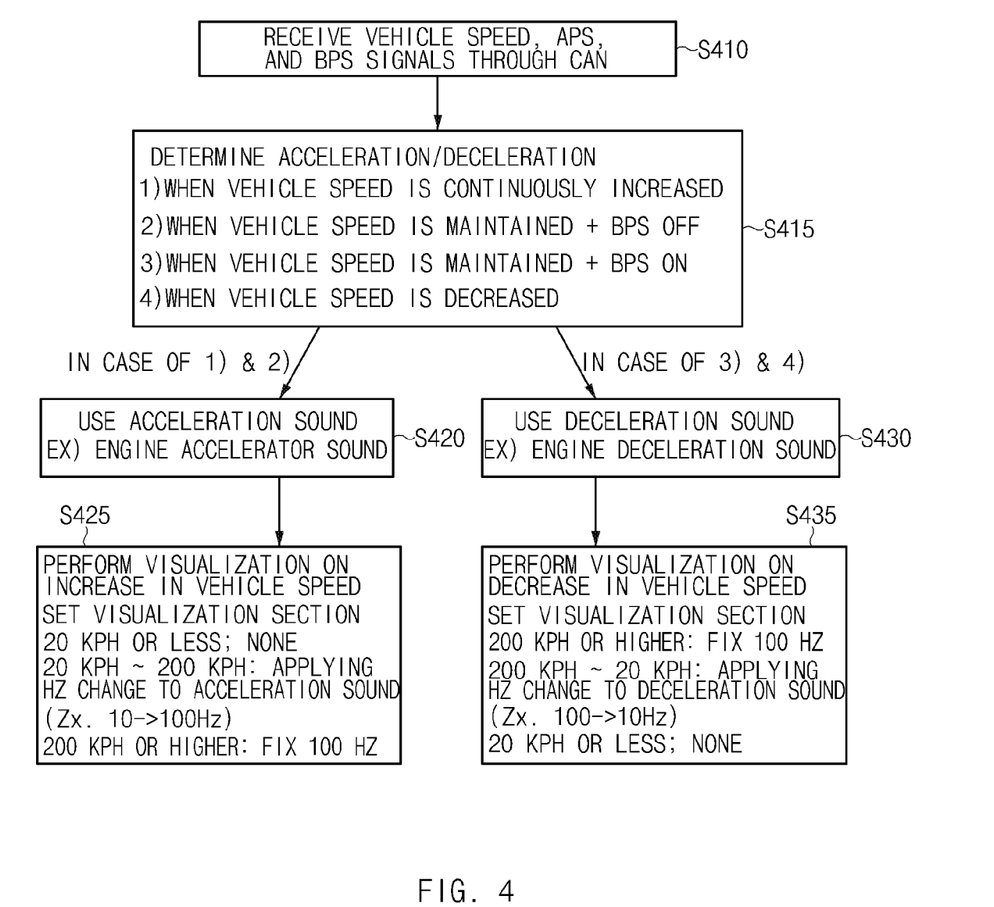
FIG. 4 is a flowchart illustrating a procedure of outputting a vehicle sound in consideration of a speed of a vehicle according to an example of the present disclosure.

FIG. 4 is a flowchart illustrating a concept of performing a sound output according to vehicle speed determination according to an example of the present disclosure.

Referring to FIG. 4, according to an embodiment of the present disclosure, a vehicle sound system (e.g. an engine electronic control apparatus) is configured to identify the signal of the accelerator pedal/brake pedal transmitted from the vehicle driving control system (step 410) and to output a distinguishable sound for each vehicle speed (step 420) based on a vehicle speed signal (steps 420, 430). At this time, the sense of distinction during acceleration is implemented to output a higher frequency as the speed increases. For example, the vehicle sound system is configured to organize a profile for the booming sound of an engine and to transform and output a frequency such that the distinction is possible such as 10 Hz at about 20 kph and 100 Hz at about 200 kph (step 425). In the meantime, the vehicle sound system is configured to transform and output a frequency corresponding to the vehicle speed into the frequency of 100 Hz at about 200 kph, the frequency of 10 Hz at about 20 kph, or the like by changing a timbre during deceleration (step 435).

As described above, as it is defined that sounds different depending on the high/low speed and sounds different for each corresponding speed section are provided, a driver may guess a vehicle speed, using only the sounds.

According to an embodiment of the present disclosure, a vehicle driving control system may include a vehicle speed sensor for detecting a vehicle speed, an accelerator position sensor (APS) for detecting the operation on state and the operation amount of the accelerator pedal, a brake pedal position sensor (BPS) for detecting the operation on state and the operation amount of the brake pedal, and a controller for controlling a vehicle engine based on a signal of the engine providing the driving force of the vehicle.

Herein, according to an embodiment of the present disclosure, the vehicle speed sensor may be formed of a vehicle speed sensor that is attached to a wheel and detects a turning speed; for another example, the vehicle speed sensor may be formed of a vehicle speed sensor attached to the longitudinal reduction gear of the transmission. Alternatively, the technical idea of the present disclosure may be applied to a configuration capable of calculating a value corresponding to a substantial vehicle speed.

For example, the APS may be formed by including a switch turned on when the motion of an accelerator pedal is detected, and a resistance sensor, of which the resistance value changes in conjunction with the motion of the accelerator pedal; alternatively, in the case of a configuration capable of calculating the value corresponding to the movement of the substantial accelerator pedal, the technical idea of the present disclosure may be applied to the configuration.

For example, the BPS may be formed by including a switch turned on when the motion of a brake pedal is detected, and a resistance sensor, of which the resistance value changes in conjunction with the motion of the brake pedal; alternatively, in the case of a configuration capable of calculating the value corresponding to the movement of the substantial brake pedal, the technical idea of the present disclosure may be applied to the configuration.

In more detail, the vehicle sound system receives the vehicle speed, APS, and BPS signals through CAN (step 410), and determines acceleration/deceleration by identifying the received signals (step 415). At this time, 1) when the vehicle speed is continuously increased, or 2) when the vehicle speed is maintained and the BPS is off, for example, the vehicle sound system outputs an acceleration sound such as an engine acceleration sound (step 420). The vehicle sound system may perform visualization/audioization on the increase in the vehicle speed, and may set the visualization/audioization section (step 425).

For example, the vehicle sound system is configured to provide a sound by applying a frequency change to the acceleration sound at the range of 20 kph~200 kph (10→100 Hz). At this time, a separate sound is not provided at a preset low speed (e.g., 20 kph) or less; the fixed sound of 100 Hz may be provided at a preset high speed (e.g., 200 kph) or higher.

In the meantime, 3) when the vehicle speed is maintained, the BPS is on, or 4) when it is determined that a vehicle speed is decreased, the vehicle sound system outputs a deceleration sound such as an engine deceleration sound (step 430). The vehicle sound system may perform visualization/audioization on the decrease in the vehicle speed, and may set the visualization/audioization section (step 435). For example, the vehicle sound system is configured to provide a sound by applying a frequency change to the deceleration sound at the range of 20 kph~200 kph (100→10 Hz). At this time, a separate sound is not provided at a preset low speed (e.g., 20 kph) or less; the fixed sound of 100 Hz may be provided at a preset high speed (e.g., 200 kph) or higher.

Herein, the fixed sound value and the preset value at the specified range may be defined as different values depending on the user's request; the increase of the acceleration sound according to acceleration may also be changed and set to the value changed depending on the user's settings.

As described above, according to an embodiment of the present disclosure, the vehicle sound system has a specific sound profile with respect to vehicles based on motor driving; the vehicle sound system receives the vehicle speed signal and then changes the same sound into low frequency at the low vehicle speed or high frequency at the high vehicle speed; accordingly, the vehicle sound system is configured to output the changed sound through a speaker. The sound is distinguished during acceleration and deceleration; when the vehicle speed is increased or maintained but there is no brake signal, the vehicle sound system uses the sound profile of acceleration; when the vehicle speed is decreased or maintained but the brake signal is present, the vehicle sound system uses the sound profile of deceleration; accordingly, the vehicle sound system is configured to generate the sense of distinction.

Figure 5:
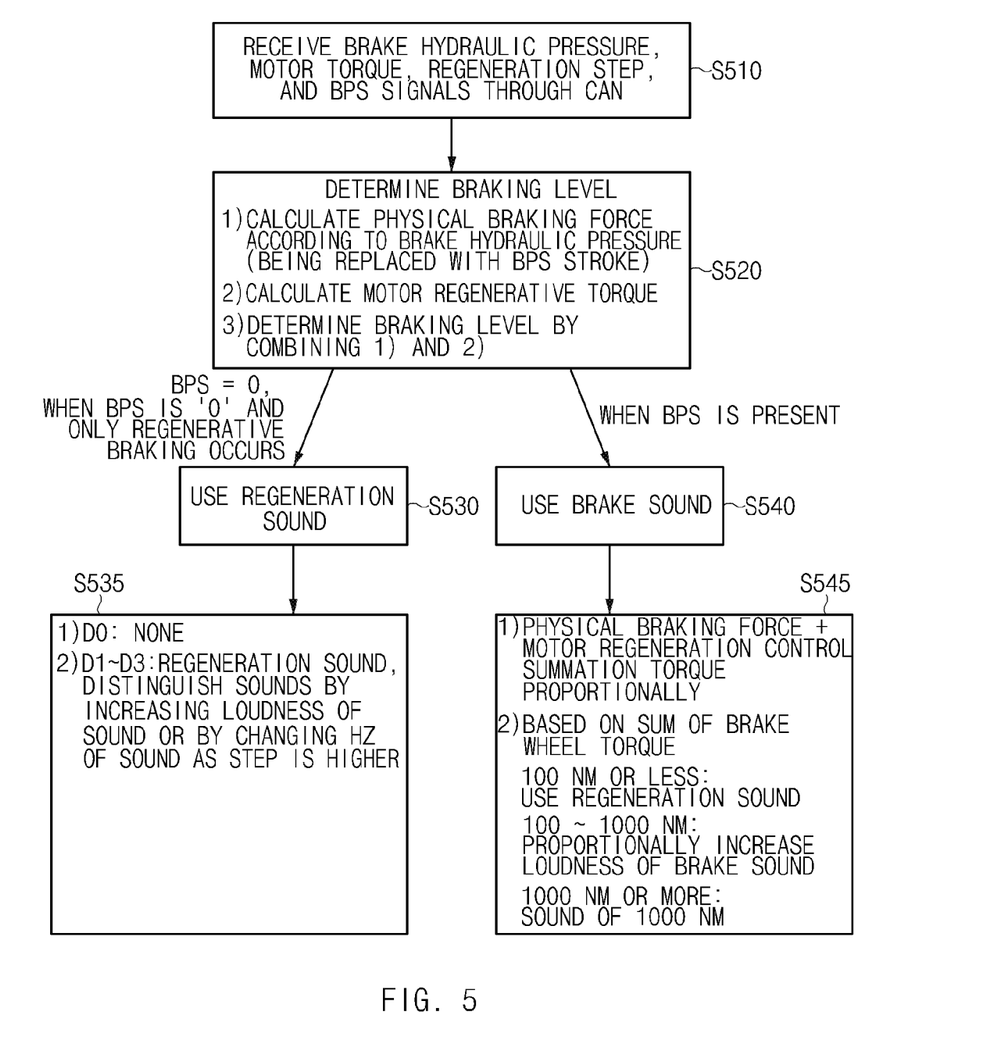
FIG. 5 is a flowchart illustrating a procedure of outputting a vehicle sound in consideration of a braking level of a vehicle according to an example of the present disclosure.

FIG. 5 is a flowchart illustrating a concept of performing a sound output according to braking determination according to an example of the present disclosure.

Referring to FIG. 5, a vehicle sound system sums the braking force according to the brake hydraulic volume and the motor torque during regeneration (step 510), and calculates the braking force applied to each tire (step 520). The vehicle sound system is configured to increase the sound level, such as the tire skid noise level, or the like, in proportion to the magnitude of the braking force (steps 530, 540).

In more detail, the vehicle sound system receives a signal of brake hydraulic pressure, motor torque, regeneration step, BPS, or the like transmitted from a motor controlling device through CAN (step 510), and identifies the received signals to determine a braking level (step 520). The braking level may be determined by combining 1) the calculation of the physical braking force according to the brake hydraulic pressure (being replaced with a BPS stroke) and 2) the calculation of the motor regenerative torque (including the consideration of the regenerative step).

At this time, when BPS is '0' and only the regenerative braking occurs, a regeneration sound is output (step 530). At this time, the vehicle sound system may perform visualization/audioization on the regeneration sound for each step (step 535). For example, the vehicle sound system may be configured to use "D0: None", "D1~D3: regeneration sound"; and the vehicle sound system may provide a sound by increasing the loudness of the sound or by changing frequency of the sound as a step is higher (providing the sense of distinction).

On the other hand, when BPS is present, the brake sound is output (step 540). The vehicle sound system may be configured 1) to calculate the summation torque in consideration of the physical braking force+motor regeneration and to control the summation torque proportionally. The vehicle sound system may be configured 2) to use a regeneration sound at "100 Nm or less", to output a sound to proportionally increase the loudness of the brake sound" at "100 to 1000 Nm", and to provide the sound of 1000 Nm" at "1000 Nm or more", based on the sum of brake wheel torque (step 545).

As described above, according to an embodiment of the present disclosure, the sound system has a specific sound profile with respect to vehicles based on motor driving; the sound system receives the motor torque, regenerative stage, brake signal and brake hydraulic signal to obtain the total braking amount and changes the sound according to the braking amount; accordingly, the vehicle sound system is configured to output the changed sound through a speaker. Also, with regard to the brake sound, when the driver does not press the brake pedal but the accelerator is off and regenerative braking is applied, the vehicle sound system is configured to use the brake sound profile according to the regeneration stage. In addition, when the driver presses the brake pedal, the vehicle sound system uses another brake sound profile with respect to a specific torque or higher; the vehicle sound system performs the control of applying a sound change according to the magnitude of the braking force.

Figure 6:
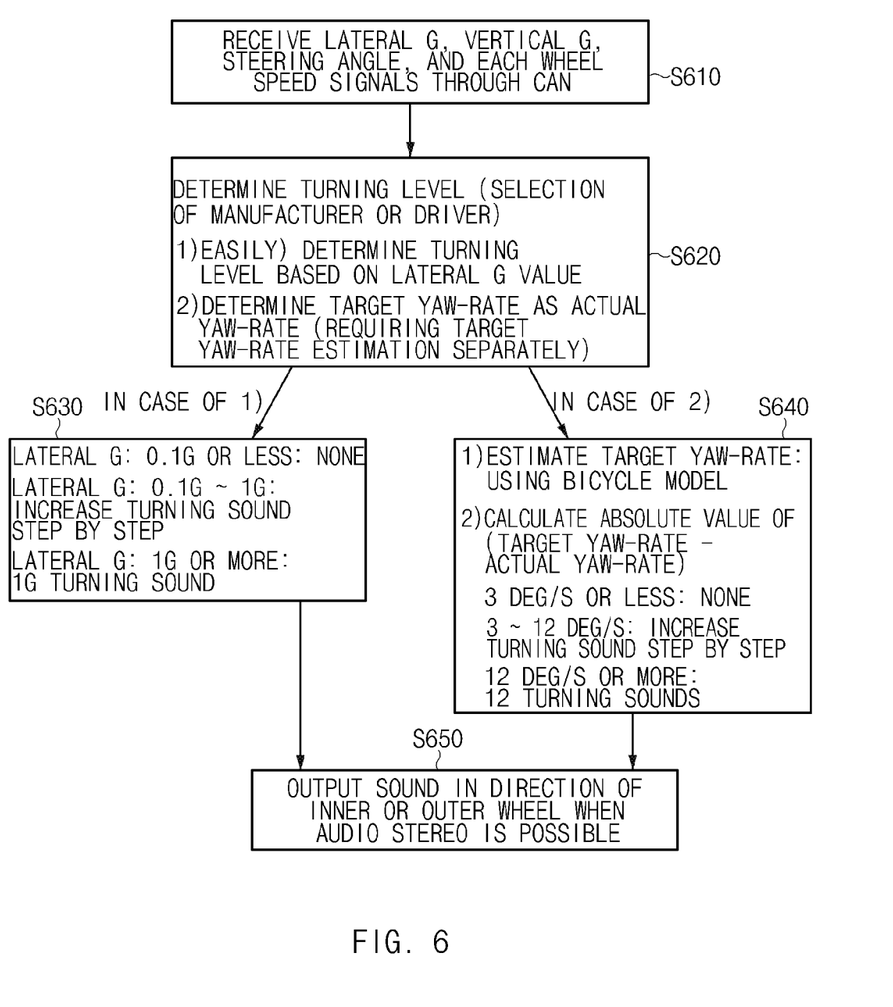
FIG. 6 is a flowchart illustrating a procedure of outputting a vehicle sound in consideration of a turning amount of a vehicle according to an example of the present disclosure.

FIG. 6 is a flowchart illustrating a concept of performing a sound output according to a turning determination according to an example of the present disclosure.

Referring to FIG. 6, when a vehicle is rotated, the lateral force is generated; when the lateral force of a specific level or higher occurs, the under-steer or over-steer phenomenon occurs in the vehicle. That is, the under-steer appears when the change of the steering wheel turning angle, that is, an angle at which the steering wheel is rotated when the vehicle is accelerating during driving, lacks as much turning as desired; in contrast, the over-steer appears when the vehicle tries to get inside the circle, that is, when the steering wheel is bent excessively.

Accordingly, according to an embodiment of the present disclosure, the vehicle sound system selectively controls the level of the sound, such as the tire skid noise level, in proportion to the difference between the calculation and target yaw-rate and the actual yaw-rate of the vehicle (step 650), based on the steering angle and lateral g signal transmitted from the cluster sensor via CAN (step 610).

In particular, the cluster sensor of a vehicle apparatus may detect the lateral acceleration of the vehicle, or the like. The cluster sensor may include an acceleration sensor, a G sensor, a lateral g sensor, a yaw sensor, a yaw-rate sensor, or the like; when the vehicle is driving, the cluster sensor may detect the signal of the lateral g, longitudinal G, steering angle, each wheel speed, or the like, which may be transmitted to the vehicle sound system through CAN (step 610). Accordingly, the cluster sensor determines the turning amount of a vehicle (step 620).

The turning amount of the vehicle may be set differently depending on the selection of a manufacturer or driver. For example, 1) the turning amount may be (easily) determined based on the lateral g value, or 2) it may be determined that a target yaw-rate is the actual yaw-rate (requiring a target yaw-rate estimation separately). Herein, when the turning amount is determined through 1) lateral g, the vehicle sound system may be configured to output a turning sound based on a predetermined setting value (step 630).

For example, 1a) at "lateral g: 0.1 g or less", it is controlled such that there is no turning sound output, 1b) at "lateral g: 0.1 g~1 g", it is controlled to increase a turning sound step by step, or 1c) at "lateral g: 1 g or more", it is controlled to fix 1 g turning sound and to output the 1 g turning sound. In the meantime, 2) when the target yaw-rate is compared with the actual yaw-rate, and then the compared result is output upon outputting the turning sound, the vehicle sound system may 2-1) estimate the target yaw-rate (using a bicycle model), 2-2) calculate the absolute value (of the target yaw-rate−an actual yaw-rate) such that the calculated yaw-rate 2a) is controlled such that there is no turning sound output at "3 deg/s or less", 2b) is controlled to increase the turning sound step by step at "3~12 deg/s", or 2c) is controlled to fix 12 turning sounds to output 12 turning sounds at "12 or more deg/s" (step 640).

As described above, according to an embodiment of the present disclosure, a vehicle controlling apparatus may include an electronic braking apparatus (ESC); a vehicle controlling apparatus may determine whether the vehicle body is stably maintained by synthesizing information measured by a steering angle, lateral acceleration, yaw-rate, wheel-speed sensor, and the like, and then may operate in the manner of controlling the braking force of each of the four wheels based on such this information. Accordingly, according to an embodiment of the present disclosure, a vehicle sound system may have a specific sound profile with respect to vehicles based on motor driving; the vehicle sound system may be controlled to receive a lateral g signal, to change a sound depending on the magnitude of the lateral g signal, and to output the sound to the speaker. Accordingly, the vehicle sound system may be configured to receive an actual yaw-rate signal, to change a sound depending on the magnitude of the actual yaw-rate signal through comparing a target yaw rate signal with the actual yaw-rate signal, and to output the sound to the speaker.

In particular, in an embodiment of the present disclosure, the athletic performance of the vehicle may be expressed audibly through the control of mixing sounds in the three cases, that is, mixing a plurality of sound changes to output the mixed sound and the control of output a turning sound through a speaker in the direction of an inner or outer turn. The driver may focus on driving visually and may feel the pleasure of driving through auditory assistance.

Figure 7:
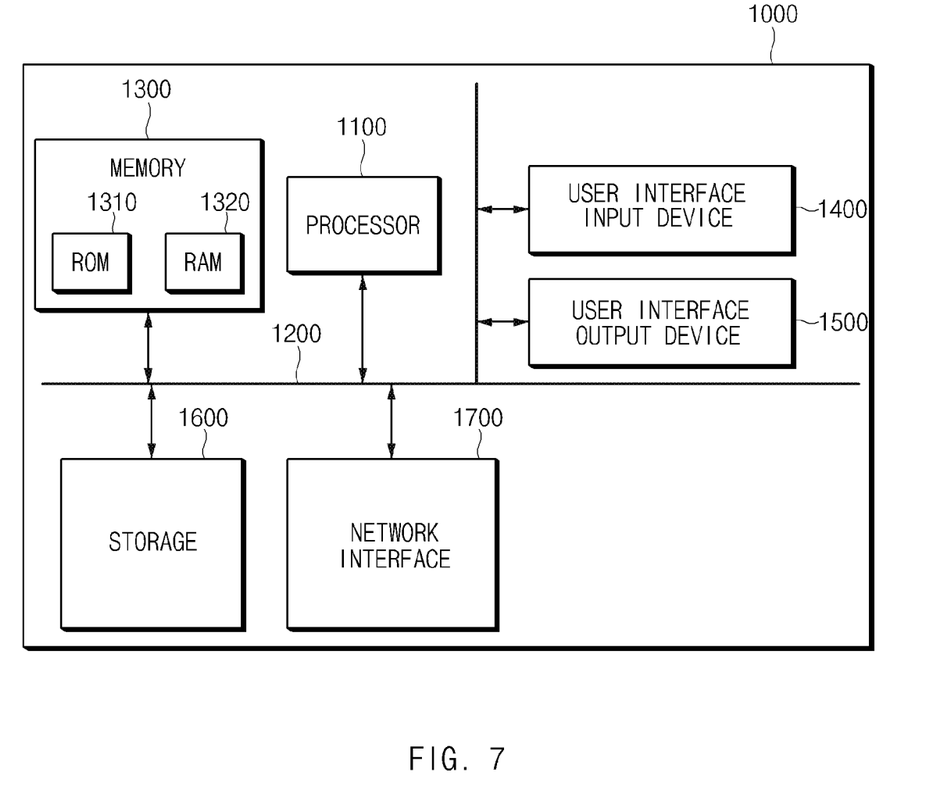
FIG. 7 illustrates a computing system according to an embodiment of the present disclosure.

FIG. 7 illustrates a computing system according to an embodiment of the present disclosure.

Referring to FIG. 7, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) and a random access memory (RAM).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

The present technology provides more reliable additional sound information and pleasant driving elements to a driver who uses vehicle sound services when an electric vehicle is driving. That is, when an electric vehicle is driving with the advantage of quietness in the electric vehicle, the present disclosure provides the driver with sound information based on various pieces of vehicle data by acoustically expressing the sound distinction element according to the vehicle speed, the sound distinction element according to the brake/regenerative braking, and the division element according to the vehicle status during turning of the vehicle.

Accordingly, it is possible to improve stability when a vehicle is driving by allowing the driver to focus on driving without visual loss; it is possible to provide a fun drive by mixing and providing various sounds based on various pieces of data. Accordingly, it is possible to provide a driver with a driving service that provides more reliable sound information and driving satisfaction.

A variety of effects directly or indirectly understood through the disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle sound controlling apparatus, comprising:
   a storage configured to store a user-optimized volume value set by a driver; and
   a processor configured to calculate a first sound according to a vehicle speed when a vehicle is driving, a second sound according to braking, and a third sound according to a vehicle status during turning of the vehicle based on the stored volume value and to mix at least one of the first to third sounds,
   wherein the processor is configured to:
   identify a brake hydraulic pressure, a motor torque, a regeneration step, and a signal of a brake pedal position sensor (BPS) transmitted from a motor controlling device to determine a brake level of the vehicle; and
   output a regeneration sound or a brake sound depending on the determined brake level of the vehicle.

2. The vehicle sound controlling apparatus of claim 1, further comprising:
   at least one speaker configured to output the at least one of the first to third sounds.

3. The vehicle sound controlling apparatus of claim 2, wherein the processor is configured to:
   output a sound through a speaker of the at least one speaker in a direction of an inner wheel or an outer wheel in the vehicle.

4. The vehicle sound controlling apparatus of claim 1, wherein the processor is configured to:
   identify a signal transmitted from a vehicle speed sensor for sensing a speed of the vehicle, an accelerator position sensor (APS) for sensing an operation on state and an operation amount of an accelerator pedal, the BPS sensor for sensing an operation on state and an operation amount of a brake pedal to determine acceleration/deceleration of the vehicle; and output an acceleration sound or a deceleration sound depending on the determined acceleration/deceleration.

5. The vehicle sound controlling apparatus of claim 4, wherein the processor is configured to:
set the acceleration sound or the deceleration sound differently for each predetermined speed section; and
output a different sound in each predetermined speed section.

6. The vehicle sound controlling apparatus of claim 1, wherein the processor is configured to:
output the regeneration sound when the BPS signal is not present; and
output the brake sound when the BPS signal is present.

7. The vehicle sound controlling apparatus of claim 6, wherein the processor is configured to:
output the regeneration sound at a magnitude or frequency differently for each predetermined speed section.

8. The vehicle sound controlling apparatus of claim 1, wherein the processor is configured to:
calculate a total sum of a determined brake wheel torque; and
output a different sound in each predetermined speed section depending on the sum and a brake sound of a different magnitude.

9. The vehicle sound controlling apparatus of claim 1, wherein the processor is configured to:
identify a steering angle, a lateral acceleration, a yaw-rate, or a wheel-speed signal transmitted from an electronic stability control (ESC) to determine a turning amount of the vehicle; and
output a turning sound differently depending on the determined turning amount.

10. A method for controlling a vehicle sound, the method comprising:
storing a user-optimized volume value set by a driver;
calculating a first sound according to a vehicle speed when a vehicle is driving, a second sound according to braking, and a third sound according to a vehicle status during turning of the vehicle based on the stored volume value and mixing at least one or more of the first to third sounds;
identifying a brake hydraulic pressure, a motor torque, a regeneration step, and a brake pedal position sensor (BPS) signal transmitted from a motor controlling device to determine a brake level of the vehicle; and
outputting a regeneration sound or a brake sound depending on the determined brake level of the vehicle.

11. The method claim 10, further comprising:
outputting the at least one or more of the first to third sounds through at least one speaker.

12. The method claim 11, further comprising:
outputting a sound through a speaker of the at least one speaker in a direction of an inner wheel or an outer wheel in the vehicle.

13. The method claim 10, further comprising:
detecting a speed of the vehicle;
detecting an operation on state and an operation amount of an accelerator pedal;
detecting an operation on state and an operation amount of a brake pedal;
determining acceleration/deceleration of the vehicle through the one or more of the detecting steps; and
outputting an acceleration sound or a deceleration sound depending on the determined acceleration/deceleration.

14. The method claim 13, further comprising:
setting the acceleration sound or the deceleration sound differently for each predetermined speed section; and
outputting a different sound in each predetermined speed section.

15. The method claim 10, further comprising:
outputting the regeneration sound when the BPS signal is not present; and
outputting the brake sound when the BPS signal is present.

16. The method claim 15, further comprising:
outputting the regeneration sound at a magnitude or frequency differently for each predetermined speed section.

17. The method claim 10, further comprising:
calculating a total sum of a determined brake wheel torque; and
outputting a different sound in each predetermined speed section depending on the sum and a brake sound of a different magnitude.

18. The method claim 10, further comprising:
identifying a steering angle, a lateral acceleration, a yaw-rate, or a wheel-speed signal transmitted from an electronic stability control to determine a turning amount of the vehicle; and
outputting a turning sound differently depending on the determined turning amount.

* * * * *